United States Patent Office 3,043,413
Patented July 10, 1962

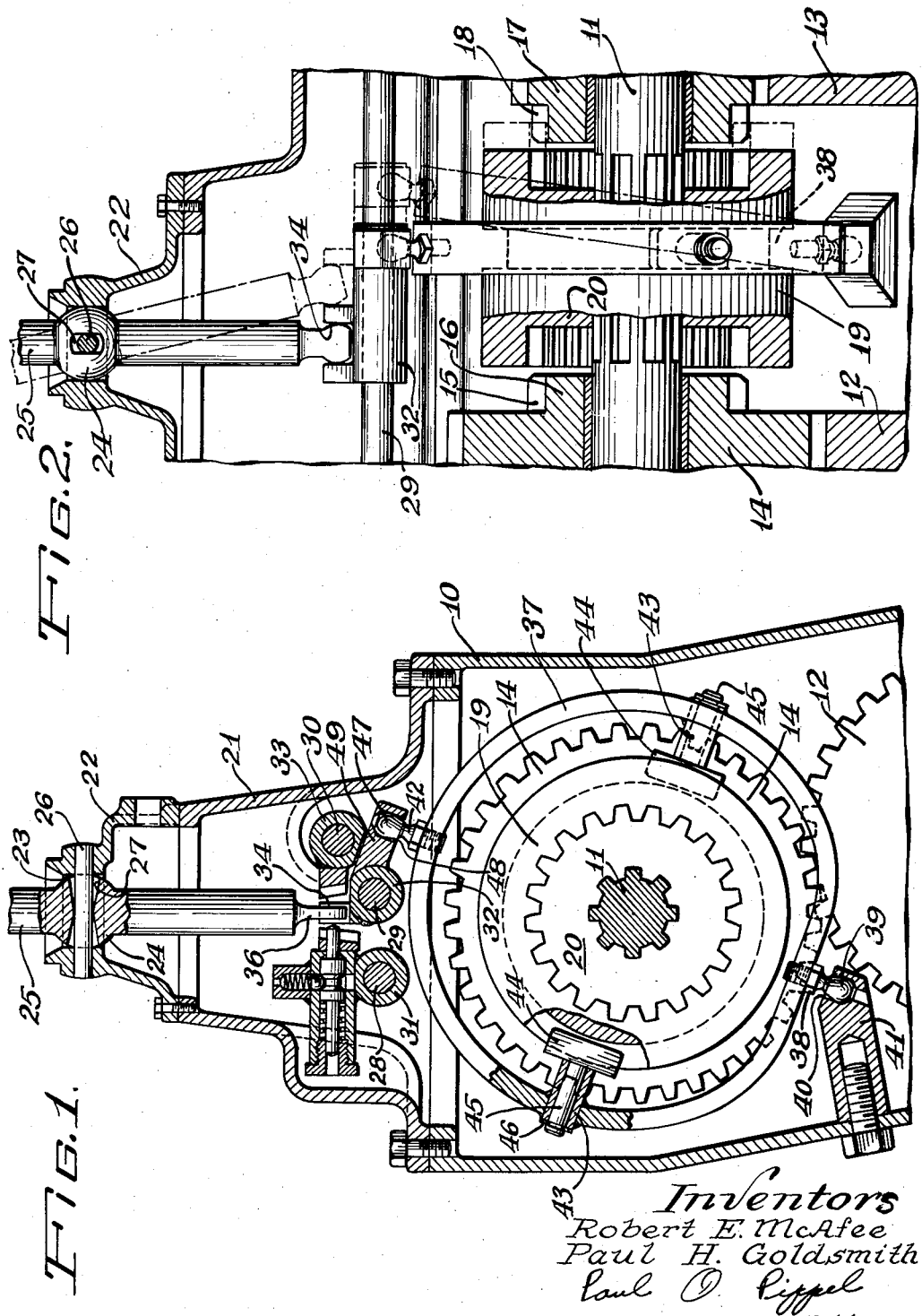

3,043,413
TRANSMISSION CONTROL
Robert E. McAfee and Paul H. Goldsmith, Fort Wayne, Ind., assignors to International Harvester Company, Chicago, Ill., a corporation of New Jersey
Filed May 25, 1959, Ser. No. 815,659
4 Claims. (Cl. 192—93)

This invention relates to a transmission control and more particularly to a new and improved means for imparting sliding movement to a control device for changing the gear ratio of a change-speed transmission.

In change-speed transmissions of the countershaft type in which constantly meshed pairs of gears of different driving ratios are selectively brought into use by a shiftable double ended clutching member operable to establish a driving relationship between the gears and the main shaft, the clutching member is generally shifted by a fork engaging a circumferential groove in the clutching member at opposite sides thereof. The fork is generally moved along the shaft to which it is splined by means of a rail parallel to the rotatable shaft to which rail the fork is fixed or may be moved along the rail by some other means. Oftentimes because of slight manufacturing inaccuracy in the positioning of the rail with respect to the rotatable shaft or because of wear of the parts, the clutching member does not move directly along the rotatable shaft upon which it is mounted but at an angle thereto. Obviously a greater amount of effort is required to effect speed ratio changes in the transmission when such inaccuracies are present than normally would be required if such was not the case. It is therefore a primary object of the present invention to provide a motion translating structure between a change-speed transmission shifter rail and the clutch member wherein the force applied to the clutching member to shift the same is always parallel to the axis of the shaft upon which it is mounted regardless of the fact that a slight misalignment of the axis of the shifter rail and the shaft exist.

Another object is the construction and arrangement of the means operably connecting a transmission shift rail and the shiftable clutching member whereby the manual effort required to effect a speed ratio change in the transmission is considerably reduced when compared to the effort needed with prior art structures.

A still further object is the provision of an improved mounting for a control member within a transmission, which control member is employed to shift a clutching member along a rotatable shaft to which the clutching member is drivingly connected.

Still another object of the invention is to provide a novel mechanism for manually shifting gears in a vehicle transmission which is simple in construction, economical to manufacture, and which effects speed ratio changes in the transmission easily and smoothly.

The foregoing and other important objects and desirable features inherent in and encompassed by the invention together with many of the purposes and uses thereof, will become readily apparent from a reading of the ensuing description in conjunction with the annexed drawings, in which:

FIGURE 1 is a vertical sectional view of a transmission control mechanism embodying the invention; and FIGURE 2 is a vertical section of the mechanism in a plane substantially at right angles to that of FIGURE 1.

Referring to the drawings in detail wherein like reference characters represent like elements throughout the various views, there is shown a portion of a change-speed transmission casing 10. Rotatably journalled in the transmission casing 10 is a shaft 11. The shaft 11 is adapted to be driven by a power unit preferably through the medium of a clutch, not shown. An output shaft, not shown, has a plurality of driven gears coaxial therewith including the gears 12 and 13 rotatable therewith and of relatively different diameters. The gear 12 is in constant mesh with a gear 14 supported on the shaft 11 for relative movement with respect thereto, as shown in FIGURE 2. A set of clutch teeth 15 is formed on the outer periphery of a reduced diameter section 16 integrally formed with the gear 14. In a similar manner a gear 17 rotatably mounted on the shaft 11 and in constant mesh with the gear 13 is provided with a set of clutch teeth 18. The gears 14 and 17 are axially spaced with respect to each other and axially fixed with respect to the shaft 11.

The transmission gears 14 and 17 are carried on the shaft 11 normally to rotate independently of the shaft and are adapted to be selectively connected to the shaft 11 for rotation therewith by a shiftable clutching member 19. Each pair of gears 14, 12 and 17, 13 form a pair of transmission gears for driving the output shaft, not shown, at different speed ratios. The shiftable clutching member 19, which is shown in FIGURE 2 in its neutral position, resembles a collar having internal splines which cooperate with external splines formed on an annular member 20. The annular member 20, in turn, has a spline connection with the shaft 11. From the foregoing it will be appreciated that the clutching member 19 is slidable axially with respect to the shaft 11 to which it is drivingly connected for rotation in unison. Thus when the clutching member 19 is moved to the left, as viewed in FIGURE 2, the internal splining will engage the teeth 15 of the gear 14 without breaking the driving connection between the member 20 and as a result the gear 14 is drivingly connected to the input shaft 11. Similarly, if the clutching member 19 is shifted to the right it will through engagement with the clutch teeth 18 connect the gear 17 with the input shaft 11.

The top wall of the transmission casing 10 includes a control tower 21 having its open upper end covered by a cap 22. The cap 22 is provided with a vertically extending cylindrical bore 23 which serves as a bearing surface for a ball-like enlargement 24 formed intermediate the ends of a manually operated gear selecting and shifting control lever 25. Control lever 25 is fastened to the cap 22 by means of a pin 26 which extends through a slot 27 extending diametrically through the enlarged ball-like portion 24. The slot 27 is generally circular at a mid region and fits the pin 26 closely at this region. At the end regions the slot 27 fits the pin 26 closely at the sides and loosely at the top and bottom, as seen in FIGURE 2. This permits the control lever 25 to rock laterally about an axis perpendicular to the plane of the paper as shown in FIGURE 1. Thus it will be appreciated that the control lever 25 has a lateral selecting movement and a fore and aft shifting movement.

Extending fore and aft in the transmission housing 10 are a plurality of shafts 28, 29, 30 slidably mounted in suitable bearings, not shown, in the transmission housing. There may be fewer or greater shafts depending upon the number of different gear ratios in the power transmission. Each of the shifter shafts or rods 28, 29 and 30 have a block 31, 32, 33 respectively secured thereto. Inasmuch as the blocks 31, 32 and 33 are similar in construction and function as far as the inventoin is concerned, only the block 32 will be described in detail. Each block 31, 32, 33 is provided with a slot extending across it. The slot 34 in the block 32 is shown in FIGURES 1 and 2. The slots are aligned when the transmission and the shifter rods 28, 29 and 30 are in neutral position. Each slot is wide enough fore and aft as well as sideways to receive the lower end or shifting finger 36 of the control lever 25 within it. The slots are so arranged that lateral movement of the control lever 25 to pivot the shifting finger 36 about an axis perpendicular to the axis of the pin 26 from one limit of lateral movement to the other causes the shifting finger 36 to individually enter the slots 34. Thus the shifting finger 36 can be selectively placed in any one of the slots 34 in any one of the blocks 31, 32 or 33. When the proper selection is made the control lever 25 is then pivoted about the axis of the pin 26 to shift the chosen block and shifter rod rigidly secured thereto.

Sliding movement of the clutching member 19 along the axis of the shaft 11 to effect gear ratio changes in the transmission upon fore and aft movement of the shifter rod 29 is accomplished by means of a structure which includes a ring-like annulus 37. The annulus 37 encircles the clutching member 19 and overlies a circumferential groove 38' when the clutching member is in its neutral position substantially midway between the gears 14 and 17, as shown in FIGURE 2. A section of the annulus 37 is slightly flattened and provided with a threaded recess into which is threaded one end of a plug 38. The opposite end of the plug 38 is in the form of a ball 39 which is seated within a cylindrical socket 40 provided in a support member 41 rigidly secured to the transmission housing 10, as shown in FIGURE 1. A plug 42 similar to plug 38 is rigidly secured to the annulus 37. The plugs 38 and 42 are on diametrically opposite sides of the annulus 37 and circumferentially spaced midway between the plugs 38 and 42 are bearing sleeves 43. The bearing sleeves 43 extend through the annulus 37 and are rigidly secured thereto as by welding or the like. As shown in FIGURE 1, the longitudinal axes of the bearing sleeves 43 are in radial alignment. Positioned within the circumferential groove 38' of the clutching member 19 are a pair of shoes 44. Each shoe 44 has a cylindrical bearing portion 45 which extends through a respective bearing sleeve 43 to be pivotally supported thereby. A snap ring 46 disposed within an annular groove formed in the end of the bearing portion 45 radially outwardly of the annulus 37 is utilized to maintain each of the shoes 44 on the annulus 37. The ball-like end 47 of the plug 42 is adapted to be seated within a cylindrical bore or bearing socket 48 formed in an arm 49 integrally formed with the block 32. It will be appreciated that connection of the plug 42 with the arm 48 permits the plug 42 to pivot universally about the longitudinal axis of cylinder bore 48 as well as axially along the longitudinal axis of the cylindrical bore 48 with respect to the block 22.

From the foregoing it is believed the operation of the transmission control is obvious. Assuming that the control lever 25 is in neutral as shown in the drawings, the shift finger 36 extends into the slot 344 of block 32. Lateral movement of the control lever 25 about an axis perpendicular to the axis of the pin 26 from its substantially vertical neutral position will cause the shifting finger 36 to enter the slot 34 of block 31 or the slot 34 of block 33 depending upon the direction of swing. With the shifting finger 36 disposed within the slot 34 of block 32, as shown in FIGURE 1, rocking of the control lever 25 about the axis of the pin 26 to the dotted line position shown in FIGURE 2 causes the shifter rod 29 and the block 32 to move to the right. Movement of the block 32 to the right causes the annulus 37 to pivot about the ball end 39 and through the intermediary of the shoes 44 the internal splining of the clutching member 19 are forced into driving engagement with the clutch teeth 18 of the gear 17 to effect a speed ratio change in the transmission. As the annulus 37 is pivoting about the ball end 39, the plug 42, in effect, moves in an arc and pivots with respect to the block 32 and also of necessity, move axially downwardly, as viewed in FIGURE 2, along the longitudinal axis of the cylindrical bore or bearing socket 48. By virtue of the universal connections of the annulus 37 with the block 32 and the support member 41 and the pivotal connection of the shoes with the annulus 37, the direction of the force transmitted by each shoe 44 to the clutching member 19 will be parallel to the axis of the shaft 11 and the magnitude of the force transmitted by one shoe 44 will be substantially equal to the magnitude of the force transmitted by the other shoe 44. The motion translating mechanism interconnecting the block 32 and the clutching member 19 is self-aligning. Furthermore, because of the disposition of the shoes 44 with respect to the connection of the annulus 37 to the block 32 and the support member 41, the effort required by the vehicle operator to effect shifting movements of the clutching member 19 is substantially reduced which results in smooth and easy operation of the transmission. The resultant force is approximately doubled from that applied to the annulus 37 by the block 32.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude, but rather to suggest such other adaptations and modifications of the invention as fall within the spirit and scope of the invention and as defined in the appended claims.

What is claimed is:

1. In a change speed transmission comprising a housing, a rotatable shaft within said housing, a clutch member shiftable along said shaft and drivingly connected thereto, said clutch member having an annular groove formed in its outer peripheral surface, and a rail shiftable axially along an axis spaced from said shaft, the combination, of motion transmitting means operatively interconnecting the rail and clutch member whereby axial shifting of the rail effects shifting of the clutch member along the shaft including a ring-like annulus encircling and radially spaced from said clutch member, means for connecting said annulus to said housing including a support member fixed to said housing having a cylindrical bearing socket having a semi-spherical bearing seat closing one end of said socket and a plug fixed to a section of said annulus provided with a ball-like end disposed within said bearing socket and seated on said semi-spherical bearing seat, said plug being universally pivotal about the longitudinal axis of said socket with respect to said support member, means for operatively connecting a section of said annulus diametrically opposite said section connected to the housing to said rail including a block fixed to said rail having a cylindrical bearing socket formed therein, and a second plug fixed to said annulus, said plug having a ball-like end disposed within said cylindrical bearing socket formed in said block, said second plug being universally pivotal about and axially movable along the longitudinal axis of said bearing socket with respect to said block and a pair of circumferentially spaced, pivotally mounted shoes carried by said annulus, each of said shoes having a pair of spaced and parallel flat surfaces, said shoes being disposed within said annular groove formed in said clutch member, said spaced and parallel flat surfaces of said shoes being adapted to slidingly engage said clutch member.

2. In a change speed transmission comprising a housing, a rotatable shaft within said housing, a clutch member shiftable along said shaft and drivingly connected thereto, said clutch member having an annular groove formed in its outer peripheral surface, and a rail shiftable axially along an axis vertically spaced above said shaft, the combination, of motion transmitting means operatively interconnecting the rail and clutch member whereby axial shifting of the rail effects shifting of the clutch member along the shaft including a ring-like annulus encircling and radially spaced from said clutch member, means for connecting said annulus to said housing including a support member fixed to said housing having a cylindrical bearing socket having a semi-spherical bearing seat closing one end of said socket and a plug fixed to a section of said annulus provided with a ball-like end disposed within said bearing socket and seated on said bearing seat, said plug being universally pivotal about the longitudinal axis of said bearing socket with respect to said support member, said bearing socket being vertically spaced below the rotational axis of said shaft, means for operatively connecting a section of said annulus diametrically opposite said section connected to the housing to said rail including a block fixed to said rail having a cylindrical bearing socket formed therein, and a second plug fixed to said annulus, said second plug having a ball-like end disposed within said cylindrical bearing socket formed in said block, said second plug being universally pivotal about and axially movable along the longitudinal axis of said bearing socket with respect to said block, and a pair of circumferentially spaced pivotally mounted shoes carried by said annulus and disposed radially inwardly of said annulus, each of said shoes having a pair of spaced and parallel flat surfaces, said shoes being disposed within said annular groove formed in said clutch member, said spaced and parallel flat surfaces of said shoes being adapted to slidingly engage said clutch member, the pivotal axis of each of said shoes extending radially with respect to said annulus and intersecting said annulus at a point circumferentially spaced substantially midway between said means connecting said annulus to said fixed support and said block.

3. In a change speed transmission comprising a housing, a rotatable shaft within said housing, a pair of relatively rotatable structures each having a set of clutch teeth, a toothed clutch member intermediate said sets of clutch teeth shiftable along said shaft and drivingly connected thereto to selectively clutch said clutch teeth, said clutch member having an annular groove formed in its outer peripheral surface, and a rail shiftable axially along an axis spaced vertically above said shaft, the combination of motion transmitting means operatively interconnecting the rail and clutch member whereby axial shifting of the rail effects shifting of the clutch member along the shaft including a ring-like annulus encircling and radially spaced from said clutch member, means for connecting said annulus to said housing including a support member fixed to said housing having a cylindrical bearing socket having a semi-spherical bearing seat closing one end of said socket and a plug fixed to a section of said annulus provided with a ball-like end disposed within said bearing socket and seated on said bearing seat, said plug being universally pivotal about the longitudinal axis of said bearing socket with respect to said support member, said means being vertically spaced below a horizontal plane containing the axis of rotation of said shaft, means for operatively connecting a section of said annulus diametrically opposite said last-mentioned means including a block fixed to said rail having a cylindrical bearing socket formed therein and a radially outwardly extending second plug fixed to said annulus, said second plug having a ball-like end disposed within said cylindrical bearing socket formed in said block, said second plug being universally pivotal about and axially movable along the longitudinal axis of said bearing socket with respect to said block and a pair of circumferentially spaced pivotally mounted shoes carried by said annulus, each of said shoes having a pair of spaced and parallel flat surfaces, said shoes being disposed radially inwardly of said annulus and within said annular groove formed in said clutch member, said spaced and parallel flat surfaces of said shoes being adapted to slidingly engage said clutch member.

4. In a change speed transmission substantially as set forth in claim 3, wherein the pivotal axis of each shoe extends radially with respect to said annulus and intersects said annulus at a point circumferentially spaced substantially midway between said means connecting said annulus to said housing and said block.

References Cited in the file of this patent
UNITED STATES PATENTS

| | | |
|---|---|---|
| 1,660,477 | Conradson | Feb. 28, 1928 |
| 2,485,732 | Gustafson | Oct. 25, 1949 |
| 2,624,437 | Gardner | Jan. 6, 1953 |
| 2,708,497 | Parrett | May 17, 1955 |